United States Patent [19]

Wilson

[11] 4,015,668
[45] Apr. 5, 1977

[54] POWER CULTIVATOR APPARATUS

[76] Inventor: Richard R. Wilson, 6901 W. 36th Street South, Wichita, Kans. 67215

[22] Filed: Oct. 21, 1974

[21] Appl. No.: 516,433

[52] U.S. Cl. .................................. 172/260; 74/474; 74/478; 74/512; 172/43; 172/424; 172/495; 180/19 R; 180/103 R
[51] Int. Cl.² .................. A01B 69/00; B62D 51/04
[58] Field of Search ............... 172/42, 43, 240, 256, 172/257, 258, 259, 260, 337, 339, 343, 424, 495; 180/19 R, 19 S, 19 H, 103; 280/43.17, 43.19, 43.22; 200/157; 74/474, 478, 478.5, 512, 513

[56] References Cited

UNITED STATES PATENTS

| | | | |
|---|---|---|---|
| 1,363,910 | 12/1920 | Parker | 180/19 R |
| 1,366,019 | 1/1921 | Nobbs | 180/19 R |
| 1,662,211 | 3/1928 | Shier | 74/513 |
| 2,067,781 | 1/1937 | Mueller | 172/42 X |
| 2,211,260 | 8/1940 | Donald | 172/260 |
| 2,314,035 | 3/1943 | Dontje | 172/42 |
| 2,468,977 | 5/1949 | Hobbs | 74/512 X |
| 2,535,614 | 12/1950 | Ausdall | 180/19 R |
| 3,199,366 | 8/1965 | Herrington, Jr. | 74/512 |
| 3,694,596 | 9/1972 | Carlson | 200/157 X |
| 3,773,112 | 11/1973 | Zinck | 172/42 |
| 3,849,620 | 11/1974 | Melisz | 200/157 |

*Primary Examiner*—Richard T. Stouffer
*Attorney, Agent, or Firm*—Phillip A. Rein

[57] ABSTRACT

A power cultivator apparatus being a self propelled device having structure for supporting a tool member thereon for earthworking operations in a limited space or area requirement such as cultivating a single row at a time. More particularly, the power cultivator apparatus provides a power assembly mounted on a support and guide assembly; a tool member connected to the support and guide assembly for earthworking purposes; and a control assembly having foot actuated members operable to 1) raise and lower the tool member, 2) operate a transmission assembly; and 3) raise and lower front forward lateral support wheel assemblies for ease of operation.

2 Claims, 6 Drawing Figures

POWER CULTIVATOR APPARATUS

In the prior art, numerous types of self powered cultivator tools are available adapted to pull or push a tool member for earthworking purposes. However, the prior art devices are large in size and are not operable to cultivate a single row at a time as achieved by the applicant's invention. Additionally, the prior art cultivator devices are more complicated in structure, expensive to manufacture, and limited in operation.

In one preferred embodiment of this invention, a power cultivator apparatus is provided including 1) a power means mounted on a support and guide means; 2) a tool means mounted on the support and guide means having an earthworking member; and 3) a control means operably connected to the power means, support and guide means, and tool means for proper operation. The support and guide means includes a main support frame assembly; a central drive wheel assembly operable to engage a support surface to achieve motivation; a lateral support wheel assembly mounted on a forward portion of a main support frame assembly; and a handle bar assembly mounted on a rear portion of the main support frame assembly. The central drive wheel assembly is provided with a large wheel member connected to the power means to propell the entire power cultivator apparatus. The handle bar assembly is provided with a pair of parallel handle members interconnected by a connector tube for rigidity. The handle members are provided with grip sections to be grasped and operable similar to a bicycle handle bar for directing the same. The lateral support wheel assembly is provided with a pair of spaced wheel members mounted on a common shaft and are pivotal from a lower support positiion to an upper earthworking position. The power means includes a power assembly connected through a clutch assembly and a transmission assembly to the central drive wheel assembly. The power assembly is in an internal combustion engine having an output power shaft connected to the clutch assembly. The clutch assembly is of a centrifical type operable on increased rotation of the output power shaft to be connected through the transmission assembly to the central drive wheel assembly. The transmission assembly is operable in one position for forward movement and in a second position for reverse movement. The tool means includes a tool support assembly having a tool member mounted thereon. The tool support assembly is provided with a tool support frame interconnected to a foot operable tool actuator. The foot operable tool actuator is utilized to move the tool support frame adjustably vertically while maintaning the tool member in a parallel horizontal plane. The control means includes 1) a power control assembly; 2) a transmission control assembly; 3) a tool control assembly; and 4) a wheel control assembly. The power control assembly is operable to control the power output from the power assembly being an accelerator type control. The transmission control assembly includes a foot operable transmission actuator interconnected by a linkage assembly to the transmission assembly. The tool control assembly is provided with a foot operable tool actuator which is operable by the use of one's foot to raise and lower the tool support frame. The wheel control assembly is provided with a foot operable wheel actuator and utilized to raise and lower the forward lateral support wheel assembly by the use of one's foot so as to be 1) self supporting or 2) raising the forward wheels for an earthworking operation.

One object of this invention is to provide a power cultivator apparatus adapted to selectively carry numerous types of earthworking tools and being of such a size and weight so as to be used by one person for cultivating a single row in an earthworking operation.

One further object of this invention is to provide a power cultivator apparatus which is self propelled; directed through a handle bar assembly; and having foot operable control means for safety reasons.

Another object of this invention is to provide a power cultivator apparatus having a power means mounted on a support and guide means; a tool means mounted on the support and guide means; and a control means whereby the speed and direction of the power cultivator apparatus is controlled by a foot operable actuator control member.

Still, one further object of this invention is to provide a power cultivator apparatus including a main drive wheel positioned centrally having a tool means rearwardly thereon and a power means forwardly so as to provide for a counterbalancing force to aid in control and in the earthworking operations.

One further object of this invention is to provide a power cultivator apparatus operable to cultivate a single row area, easily usable by one person, and having a safety member thereon to cease power output in an emergency condition.

One other object of this invention is to provide a power cultivator apparatus which is economical to manufacture; sturdy in construction; easy to use; and durable in operation.

Various other objects, advantages, and features of the invention will become apparent to those skilled in the art from the following discussion, taken in conjunction with the accompanying drawings, in which.

Figure 1:
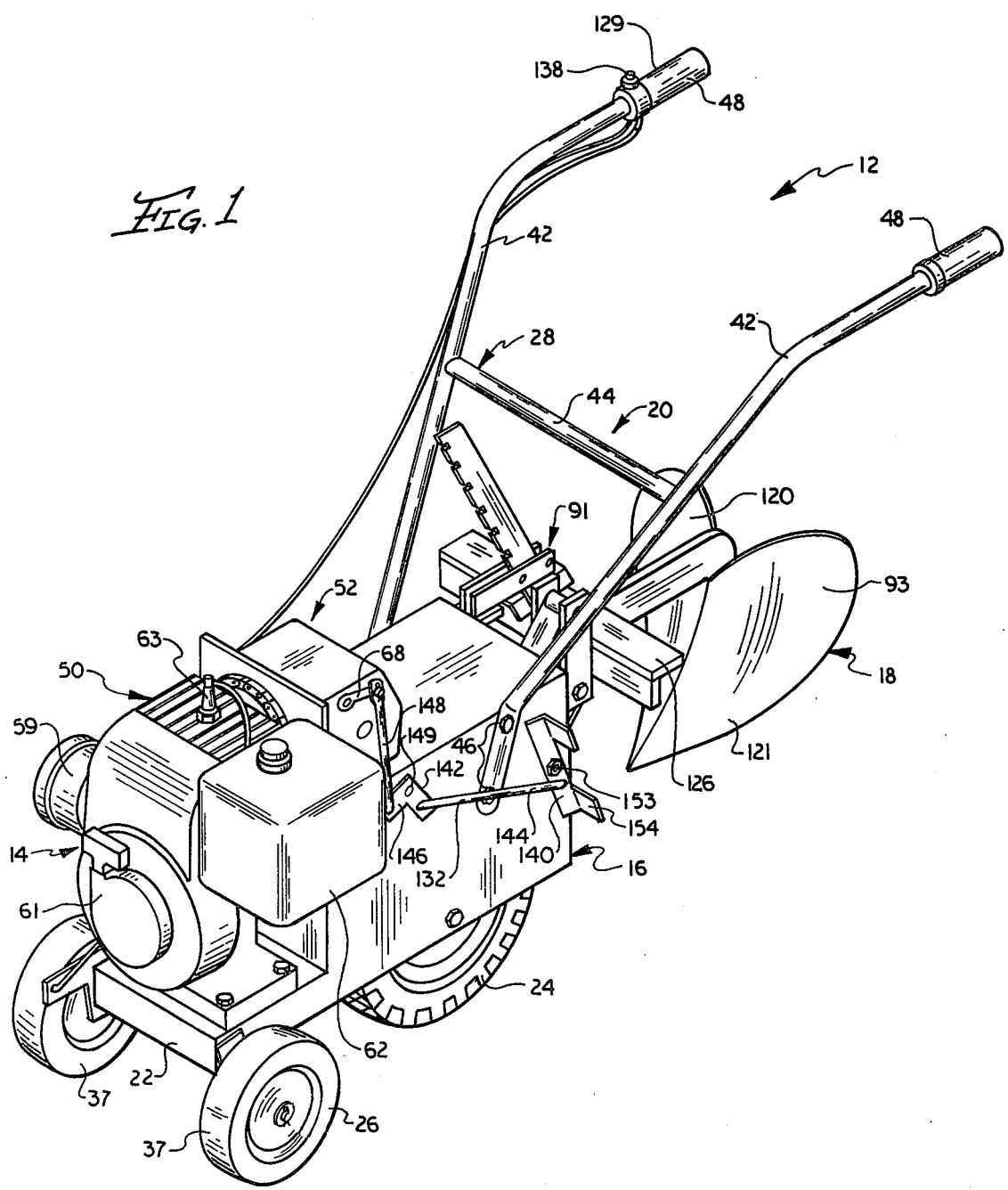
FIG. 1 is a perspective view of the power cultivator apparatus of this invention.

The following is a discussion and description of preferred specific embodiments of the new power cultivator apparatus of this invention, such being made with reference to the drawings, whereupon the same reference numerals are used to indicate the same or similar parts and/or structure. It is to be understood that such discussion and description is not to unduly limit the scope of the invention.

In one preferred embodiment of this invention as shown in FIG. 1, a power cultivator apparatus, indicated generally at 12, is illustrated of a size similar to a lawn mower but of a narrow width so as to be utilized to cultivate between rows of corn or the like. More particularly, the power cultivator apparatus 12 includes a power means 14 mounted on a support and guide means 16; a tool means 18 connected to the support and guide means 16; and a control means 20 connected to the power means 14, the tool means 18, and the support and guide means 16.

The support and guide means 16 includes a main support frame assembly 22; a central drive wheel assembly 24 mounted on the support frame assembly 22; a lateral support wheel assembly 26 mounted on a forward portion of the main support frame assembly 22; and a handle bar assembly 28 mounted on a rear portion of the main support frame assembly 22. The main support frame assembly 22 includes a base frame member 30 having a connector or drive wheel shaft 32 secured thereto. The central drive wheel assembly 24 includes a large wheel member 34 mounted on the connector shaft 32 for rotation thereon. The wheel member 34 extends substantually below the base frame member 30 to elevate same above a support surface 35.

The lateral support wheel assembly 26 includes a pair of wheel members 37 interconnected through a shaft member 39 and each wheel member 37 is connected to a generally L-shaped actuator arm member 40. The actuator arm members 40 are pivotal about the axis of the shaft member 39 from upper to lower positions in a manner to be explained.

The handle bar assembly 28 resembles a bicycle type structure having a pair of spaced handle members 42 interconnected at a mid-portion by a connector tube 44 and having the lower end connected by bolt members 46 to the base frame member 30. The upper end portions of the handle members 42 are inclined upwardly in a similar plane and having the outer ends provided with grip members 48. The handle bar assembly 28 resembles a bicycle structure but having the main portion of the power cultivator apparatus 12 positioned forwardly for steering similar to a lawn mower type structure.

Figure 2:
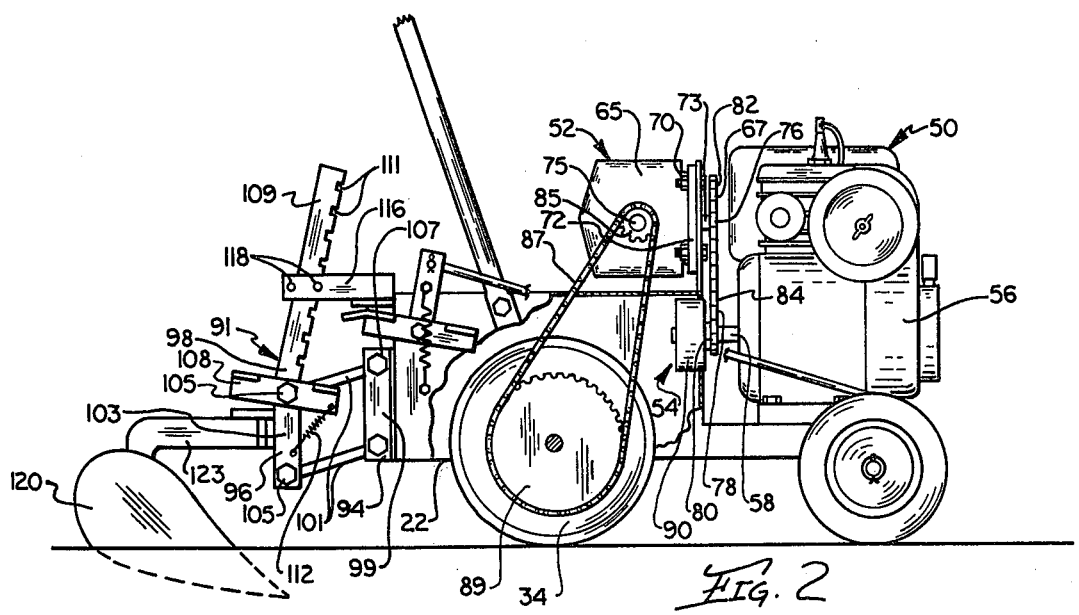
FIG. 2 is a fragmentary side elevational view of the power cultivator apparatus of this invention.

As shown in FIGS. 1 and 2, the power means 14 includes a power assembly 50 mounted on a forward portion of the base frame member 30 and a transmission assembly 52 connected through a clutch assembly 54 to the power assembly 50. The power assembly 50 includes an internal combustion engine 56 operable to drive an output power shaft 58. The internal combustion engine 56 is conventional having an air filter 59, a starter cord assembly 61, a gas tank member 62, a spark plug 63, and other like items being operable similar to a lawn mower structure.

The transmission assembly 52 includes a gear box member 65 connected through a drive connector assembly 67 to the output power shaft 58. The gear box member 65 is substantially conventional having numerous interconnected gears therein and including a laterally extended actuator lever 68 being operable to shift the transmission assembly 52 to forward and reverse positions. The gear box member 65 is secured as by bolts 70 to an upright plate 72 of the base frame member 30. The gear box member 65 has extended laterally therefrom an input shaft 73 and output shaft 75. The drive connector assembly 67 includes an input assembly 76 and an output assembly 78.

As best shown in FIG. 2, the input assembly 76 includes a drive gear 80 mounted on the power shaft 58, a driven gear 82 on the input shaft 73, and a drive chain 84 mounted on the drive gear 80 and the driven gear 82. The output assembly 78 includes a transmission output gear 85 mounted on the output shaft 75 and is interconnected by a drive wheel chain 87 to a drive wheel gear 89. The drive wheel gear 89 is secured to the wheel member 34 for conjoint rotation therewith on the connector shaft 32. Therefore, it is noted that the power generated on the output power shaft 58 is operable through the transmission drive gear 80, the transmission driven gear 82, and the drive wheel gear 89 in order to power the main drive wheel member 34 in forward or reverse directions.

The clutch assembly 54 includes a clutch member 90 operably connected to the output power shaft 58 and the drive gear 80. On acceleration of the internal combustion engine 56, centrifical force causes the clutch member 90 to connect the output power shaft 58 to the transmission assembly 52 to rotate the drive wheel member 34.

Figure 3:
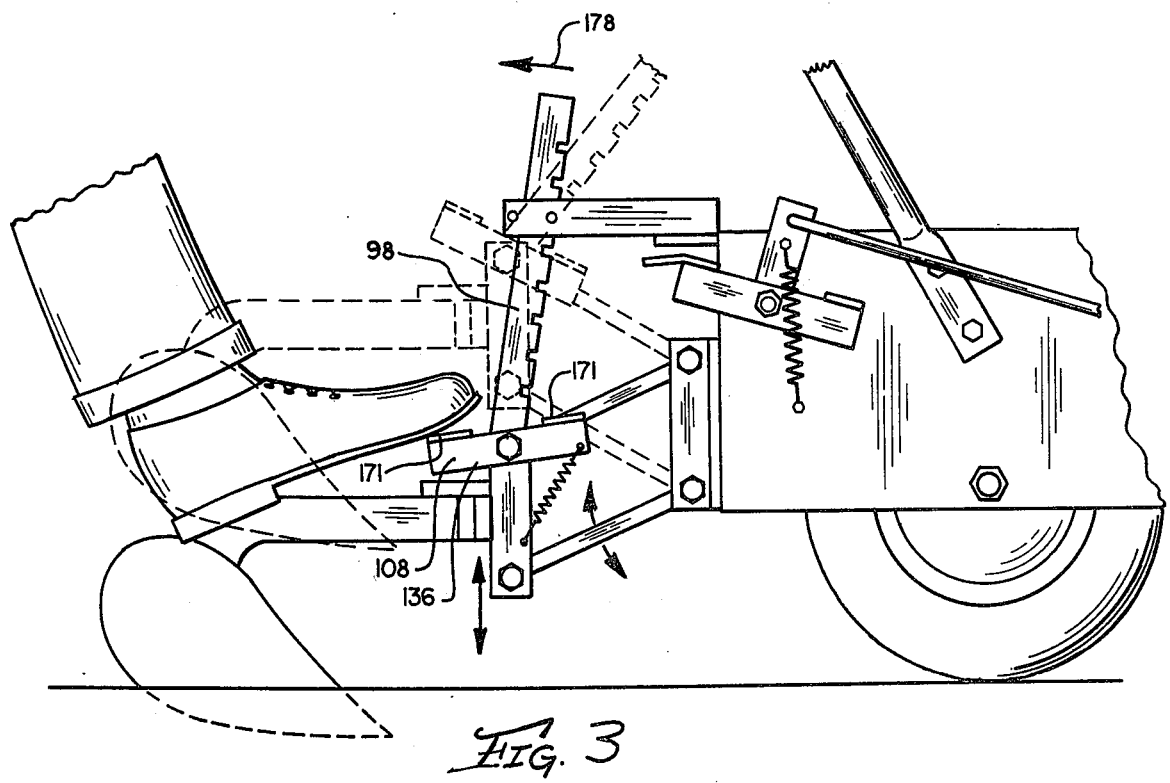
FIG. 3 is an enlarged fragmentary side elevational view of the power cultivator apparatus of this invention similar to FIG. 2 showing movement of a tool means.

The tool means 18 includes a horizontal, maintaining tool support assembly 91 having a tool member 93 mounted thereon. The tool support assembly 91 includes an anchor frame 94, a tool frame 96, and a foot operated tool actuator 98. As shown in FIGS. 1 and 3, the anchor frame 94 includes a pair of angle iron members 99 secured as by welding or the like to the main support frame assembly 22 and having a pair of linkage arms 101 extended outwardly therefrom pivotally connected to the tool frame 96. The tool frame 96 is provided with a pair of upright bar members 103 secured by bolts 105 to the linkage arms 101 and movable in a pivotal motion about pivot points 107 as shown in FIG. 3 and operable to move the tool member 93 in parallel, horizontal planes. The foot operated tool actuator 98 includes an actuator member 108 secured as by welding to a lock bar 109 having a plurality of notches 111 therein. The tool actuator combination is pivotal about an upper one of the bolts 105 to the latched and unlatched conditions as will be explained. A spring member 112 is secured to the actuator member 108 and to one of the upright bar members 103 to bias the tool actuator 98 towards the latched condition. A latch member 114 is shown as having two parallel bar members 116 with two spaced pin members 118 to provide a locking feature with the lock bar 109 on raising and lowering as will be explained.

The tool member 93 as shown in this embodiment is a single plow member 120 having a V-shaped outwardly tapered blade portion 121 secured to a support arm 123 which, in turn, is connected as by bolt members to an angle iron 127 secured to the tool frame 96.

The control means 20 includes 1) a power control assembly 129 operably connected to the power assembly 50; 2) a transmission control assembly 132 operably connected to the transmission assembly 52; 3) a wheel control assembly 134 operably connected to the lateral support wheel assembly 26; and 4) a tool control assembly 136 operably connected to the tool means 18. As shown in FIG. 1, the power control assembly 129 includes one of the handle grip members 48 which is rotatable to accelerate or decelerate the internal combustion engine 56. The engine 56 is started in a conventional manner using the starter cord assembly 61. A safety feature is provided on the handle grip member 48 whereupon the power control assembly 129 includes a switch member 138 to de-energize the internal combustion engine 56 in case of an emergency.

As shown in FIG. 1, the transmission control assembly 132 includes a foot operable transmission actuator 140 interconnected by a linkage assembly 142 to the actuator lever 68 on the gear box member 65. The linkage assembly 142 includes a first connector rod 144 connected to the foot operable transmission actuator 140 to an intermediate link member 146. A second connector rod 148 connects the intermediate link member 146 to the actuator lever 68. The intermediate link member 146 is pivotal about a bolt member 149. The foot operable transmission actuator 140 is a lever structure pivotal about a bolt member 153 and having forward and rearward laterally extended actuator plates 154 which may be moved by one's foot to operate the gear box member 65.

Figure 4:
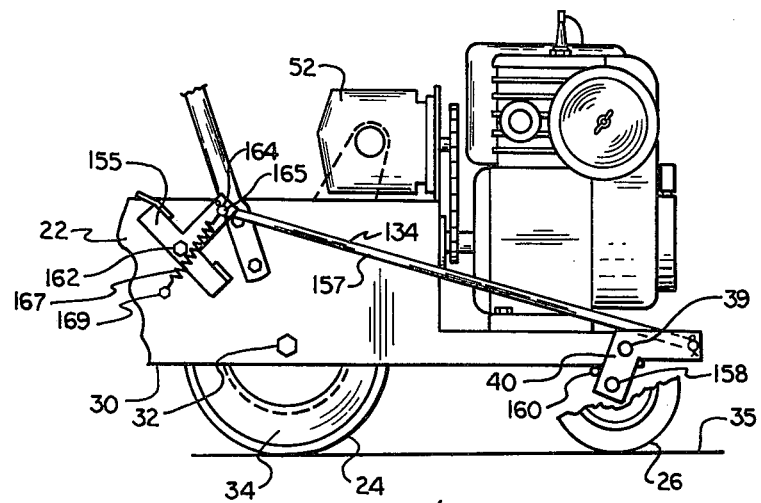
FIG. 4 is a fragmentary side elevational view of the power cultivator apparatus of this invention.
Figure 5:
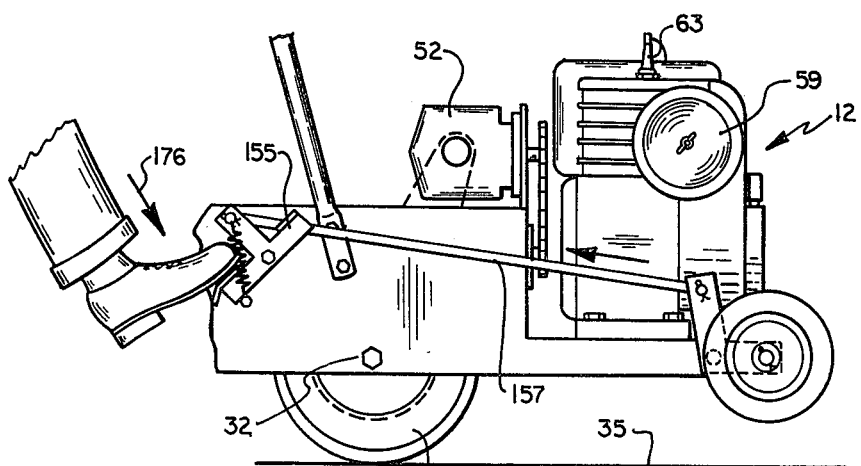
FIG. 5 is a view similar to FIG. 4 showing actuation of a lateral support wheel assembly of this invention to the raised condition.

As shown in FIGS. 4 and 5, the wheel control assembly 134 includes a foot operable wheel actuator 155 secured to the shaft member 39 which is pivotally connected to the main support frame assembly 22; and a rod member 157 pivotally connected at one end to the foot operable wheel actuator 155 and at the other end, to the actuator arm member 40 on the lateral support wheel assembly 26. The actuator arm member 40 is pivotal about the shaft member 39 with respective wheel members 37 rotatable about shafts 158. A stop member 160 on the base frame member 30 contacts the actuator arm member 40 to hold the wheel members 37 in the lowered condition (FIG. 4). The wheel actuator 155 is of a T-shape having a mid-portion pivotally connected to a bolt member 162 and a connector portion 164 connected to the rod member 157. An upper pivot point 165 has a spring member 167 mounted thereon and connected to a bolt member 169 so as to bias the foot operable wheel actuator 155. The wheel actuator 155 is operable to contact the bolt member 169 in the raised condition to be so held by the spring member 167.

As shown in FIGS. 2 and 3, the tool control assembly 136 includes the foot operable actuator member 98 which is moved to the latched and unlatched condition by one's foot. The tool actuator member 108 has laterally extended plate members 171 to receive one's foot thereon to pivot same counter-clockwise, as viewed in FIG. 2, from the latched to the unlatched condition.

In the use and operation of the power cultivator apparatus 12 of this invention, the normal storage or non-usage condition is shown in FIG. 1. In this particular condition, the wheel control assembly 134 has been actuated to the position as shown in FIG. 4 whereupon the wheel members 37 of the lateral support wheel assembly 26 have a lower surface in a plane identical with the drive wheel member 34. The position of the stop member 160 is such that forward movement of the cultivator apparatus 12 would hold the support wheel assembly 26 in the down condition.

Figure 6:
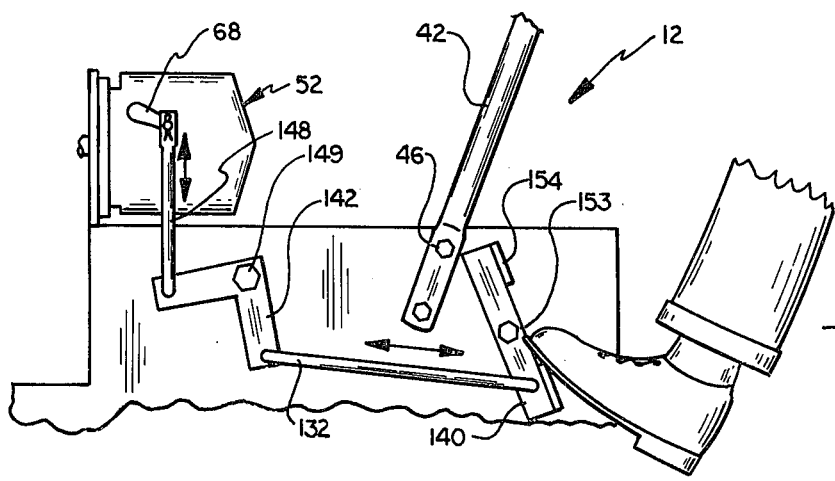
FIG. 6 is an enlarged fragmentary side elevational view of the power cultivator apparatus of this invention showing operation of a transmission control assembly.

On initiating operation of the power cultivator apparatus 12, one would utilize the starter cord assembly 61 to start the internal combustion engine 56 in a conventional manner similar to a lawn mower. After obtaining ignition of the internal combustion engine 56, one would select whether to proceed forward or rearward through use of the transmission control assembly 132. The transmission control assembly 132 is operable on movement of the foot operable transmission actuator 140 and its interconnected linkage assembly 142 to move the actuator lever 68 in either upward or downward position as shown in FIG. 6 for placing the transmission assembly 52 in condition for forward or reverse travel as desired.

On proceeding to an area to be worked with the power cultivator apparatus 12, one may raise the lateral support wheel assembly 26 through the wheel control assembly 134 by movement of the foot operable wheel actuator 155 as shown in FIG. 5 to a downward direction shown by an arrow 176 so that the spring member 162 biases the wheel members 37 of the lateral support wheel assembly 26 upwardly so as to be out of contact with the support surface 35.

Next, the operator may wish to adjust the tool member 93 within the working soil through the use of the tool control assembly 136. As shown in FIG. 3, if one wishes to lower the tool member 93 from the dotted line position in FIG. 3, one places his foot on the foot operable tool actuator 98 which would pivot backwardly as shown by an arrow 178 to take the notches 111 out of engagement with the pin members 118. In this condition, the tool frame 96 and the tool member 93 could easily be pushed downwardly to the desired depth as shown in FIG. 3. On release of one's foot from the foot operable tool actuator 98, it is seen that the spring member 112 automatically biases the interconnected lock bar 109 into engagement with the pin members 118.

Finally, on rotation of the normally right handed grip members 48 causes an increase or decrease in the acceleration of the internal combustion engine 56. On increase of speed of the internal combustion engine 56, the clutch assembly 54 is operable to interconnect the output power shaft 58, and the transmission assembly 52 to the central drive wheel assembly 24 to provide for forward movement. The drive system is completely automatic with increas in engine speed directly related to resultant ground speed through the transmission assembly 52 and the central drive wheel assembly 24.

It is noted that positioning of the internal combustion engine on a forward portion of the main support frame assembly and with the tool means on a rear portion thereof, this counterbalancing adds traction and leverage to the use of the entire power cultivator apparatus. The internal combustion engine acts as a counterbalancing force to the earthworking operation by the tool member. It is noted that the retractable lateral support wheel assembly allows the wheel members to be retracted and permits the power cultivator apparatus to run through narrow rows within a garden without damage to the plants. The utilization of the foot operable control transmission assembly permits one to keep both hands on the handle bar assembly to maintain constant control over the power cultivator apparatus when in use by using one's foot to shift in and out of gear.

Another special and important feature of this invention is the foot operable tool control means whereupon the tool member can be readily adjusted by one's foot in a most efficient and effective manner. The power means of this invention through the use of the centrifical clutch member and the twist grip type throttle on the handle bar assembly provides for automatic power movement and safety features. The twist grip throttle control on the handle bar assembly allows both hands to remain on the handle bars maintaining constant control of the cultivator apparatus. The control means allows a person to adjust the engine speed and direction of the cultivator apparatus movement without removing one's hands and the safety switch permits the engine to be de-energized in an emergency.

It is obvious that numerous types of tool members may be utilized with the cultivator apparatus of this invention with only a plow blade illustrated but numerous other types of tool members may be used.

It is seen that the power cultivator apparatus of this invention provides an economical structure which can be easily controlled by the handle bar assembly and being of a narrow construction so as to be operable in single rows of a garden area. The numerous features of the power cultivator apparatus having the foot operable 1) wheel control assembly, 2) the transmission control assembly, 3) the lateral support wheel assembly, and 4) the tool control assembly provides safety in the use and operation of this invention by keeping one's hands on the handle bar assembly. Also, it is seen that the power cultivator apparatus of this invention is sturdy in construction; economical to manufacture; safe in usage; and provides a function and operation not achieved by the prior art power cultivator structures.

While the invention has been described in conjunction with preferred specific embodiments thereof, it will be understood that this description is intended to illustrate and not to limit the scope of the invention, which is defined by the following claims.

I claim:
1. A power cultivator apparatus operable for earth-working operations in limited space areas, comprising:
  a. a power means mounted on a support and guide means;
  b. said support and guide means including a main support frame assembly having a centrally positioned drive wheel assembly connected thereto and at one end a handle bar assembly secured thereto;
  c. a tool means connected to said main support frame assembly having a tool member secured to a tool support frame;
  d. a control means including a tool control assembly to raise and lower said tool member;
  e. said tool control assembly having a foot operable tool actuator connected to said tool support frame;
  f. said tool actuator including an actuator member secured to a lock bar, and a spring member connected to said tool actuator to bias same to the latched condition;
  g. said tool support frame having a latch member releasably connectable with said lock bar;
  h. said actuator member movable through one's foot against the bias of said spring member and out of engagement with said latch member to raise or lower said tool member, and, on removing one's foot from said actuator member, said spring member moves said lock bar into locking engagement with said latch member;
  i. said support and guide means having a lateral support wheel assembly mounted on a forward portion of said main support frame assembly;
  j. said lateral support wheel assembly including a pair of wheel members each rotatably mounted on a separate shaft member from the shaft member on which the other of said pair of wheel members is mounted, each said shaft member connected to a separate actuator arm member from the actuator arm member connected to the other said shaft member, and each said arm member pivotally connected to said support frame assembly by a common shaft member interconnecting said actuator arm members;
  k. said control means including a wheel control assembly having a foot operably wheel actuator connected to one of said actuator arm members by a rod member, said wheel actuator pivotally connected to said support frame assembly and a wheel spring member connected to said wheel actuator and to said support frame to bias said wheel actuator to raised and lowered positions;
  l. said wheel actuator, when positioned in said lowered position, cooperating with said drive wheel assembly to support said power cultivator apparatus on a ground surface; and
  m. said wheel actuator, when moved by one's foot to said raised position, causes rotation of said actuator arm member and raising of said wheel members out of contact with the ground surface for earth-working operations with said tool means.

2. A power cultivator apparatus as described in claim 1, wherein:
  a. said wheel control assembly having a stop member mounted on said support frame assembly;
  b. said stop member engagable with said actuator arms in said lowered position to aid in holding in such position; and
  c. said wheel spring member connected to said wheel actuator and said support frame assembly to bias said wheel actuator in opposite directions in said lowered and raised positions about said pivotal connection to said support frame assembly.

* * * * *